(12) United States Patent
Pan et al.

(10) Patent No.: US 11,614,681 B2
(45) Date of Patent: Mar. 28, 2023

(54) ILLUMINATION SYSTEM AND PROJECTION APPARATUS

(71) Applicant: Coretronic Corporation, Hsin-Chu (TW)

(72) Inventors: Haw-Woei Pan, Hsin-Chu (TW); Kuan-Ta Huang, Hsin-Chu (TW); Yu-Hua Hsieh, Hsin-Chu (TW); Jo-Han Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/368,723

(22) Filed: Jul. 6, 2021

(65) Prior Publication Data
US 2022/0100067 A1 Mar. 31, 2022

(30) Foreign Application Priority Data
Sep. 28, 2020 (CN) .......................... 202011039760.5

(51) Int. Cl.
*G03B 21/20* (2006.01)
*G02B 27/28* (2006.01)

(52) U.S. Cl.
CPC ......... *G03B 21/204* (2013.01); *G02B 27/283* (2013.01); *G02B 27/286* (2013.01); *G03B 21/208* (2013.01); *G03B 21/2073* (2013.01)

(58) Field of Classification Search
CPC ............... G03B 21/204; G03B 21/208; G03B 21/2073; G02B 27/283; G02B 27/286

(Continued)

(56) References Cited
U.S. PATENT DOCUMENTS

2012/0127435 A1 5/2012 Kitano et al.
2015/0131062 A1* 5/2015 Nishimori ............ G03B 21/204
353/84

(Continued)

FOREIGN PATENT DOCUMENTS

CN   101836160   2/2012
CN   102890398   1/2013

(Continued)

OTHER PUBLICATIONS

"Office Action of China Counterpart Application", dated Jan. 18, 2023, p. 1-11.

*Primary Examiner* — Jerry L Brooks
(74) *Attorney, Agent, or Firm* — JCIPRNET (57) ABSTRACT

An illumination system includes a first light source, a wavelength conversion device, a first light-splitting element, a light-filtering device, and a light-homogenizing element. The first light source provides a first light beam. The wavelength conversion device includes a single wavelength conversion material configured to convert the first light beam into a conversion light beam. The first light-splitting element is disposed on transmission paths of the first light beam and the conversion light beam. The light-filtering device is disposed on the transmission paths of the first light beam and the conversion light beam. The light-homogenizing element is disposed on the transmission paths of the first light beam and the conversion light beam. When the first light beam is transmitted to the light-homogenizing element, the first light beam is not incident on the wavelength conversion device. A projection apparatus including the illumination system is also provided.

22 Claims, 9 Drawing Sheets

(58) Field of Classification Search
USPC .......................................................... 353/84
See application file for complete search history.

(56) References Cited

U.S. PATENT DOCUMENTS

2018/0239233 A1\* 8/2018 Kado ................. G03B 21/2073
2019/0369470 A1  12/2019 Yang

FOREIGN PATENT DOCUMENTS

| CN | 106909021 | 6/2017 |
| CN | 107357125 | 11/2017 |
| CN | 107505807 | 12/2017 |
| CN | 107621744 | 1/2018 |
| CN | 208188567 | 12/2018 |
| CN | 110058477 | 7/2019 |
| CN | 111176059 A \* | 5/2020 |

\* cited by examiner

ILLUMINATION SYSTEM AND PROJECTION APPARATUS

CROSS-REFERENCE TO RELATED APPLICATION

This application claims the priority benefit of China application serial no. 202011039760.5, filed on Sep. 28, 2020. The entirety of the above-mentioned patent application is hereby incorporated by reference herein and made a part of this specification.

BACKGROUND

Technical Field

The disclosure relates to an optical system and an electronic apparatus, and in particular, to an illumination system and a projection apparatus.

Description of Related Art

Projection apparatuses are display apparatuses for generating large-size images and have experienced continuous improvement with the evolution and innovation of science and technology. According to the imaging principle of a projection apparatus, an illumination light beam generated by an illumination system is converted into an image light beam via a light valve. Afterwards, the image light beam passes through a projection lens and is projected to a projection target (e.g., a screen or a wall) to form a projection image.

In addition, with the market's requirements for brightness, color saturation, service life, non-toxic and environmental protection, etc. of projection apparatuses, the illumination system has evolved from ultra-high-performance lamps (UHP lamps) to light-emitting diodes (LEDs), and to the most advanced laser diode (LD) light sources. However, in an existing optical system, rotation, adjustment, and calibration are difficult to be performed owing to the complex structure of the wavelength conversion device, and problems of limited heat dissipation effect and high costs are also observed.

The information disclosed in this BACKGROUND section is only for enhancement of understanding of the background of the described technology and therefore it may contain information that does not form the prior art that is already known to a person of ordinary skill in the art. Further, the information disclosed in the BACKGROUND section does not mean that one or more problems to be resolved by one or more embodiments of the disclosure was acknowledged by a person of ordinary skill in the art.

SUMMARY

The disclosure provides an illumination system and a projection apparatus through which a structure of a wavelength conversion device may be simplified.

Other objects and advantages of the disclosure may be further illustrated by the technical features broadly embodied and described as follows.

In order to achieve one or a portion of or all of the objects or other objects, the disclosure provides an illumination system including a first light source, a wavelength conversion device, a first light-splitting element, a light-filtering device, and a light-homogenizing element. The first light source provides a first light beam. The wavelength conversion device includes a single wavelength conversion material configured to convert the first light beam into a conversion light beam. The first light-splitting element is disposed on transmission paths of the first light beam and the conversion light beam. The light-filtering device is disposed on the transmission paths of the first light beam and the conversion light beam. The light-homogenizing element is disposed on the transmission paths of the first light beam and the conversion light beam. When the first light beam is transmitted to the light-homogenizing element, the first light beam is not incident on the wavelength conversion device.

In order to achieve one or a portion of or all of the objects or other objects, the disclosure further provides a projection apparatus including an illumination system, a light valve, and a projection lens. The illumination system is configured to provide an illumination light beam. The illumination system includes a first light source, a wavelength conversion device, a first light-splitting element, a light-filtering device, and a light-homogenizing element. The first light source provides a first light beam. The wavelength conversion device includes a single wavelength conversion material configured to convert the first light beam into a conversion light beam. The first light-splitting element is disposed on transmission paths of the first light beam and the conversion light beam. The light-filtering device is disposed on the transmission paths of the first light beam and the conversion light beam. The light-homogenizing element is disposed on the transmission paths of the first light beam and the conversion light beam. The light valve is disposed on a transmission path of the illumination beam and is configured to convert the illumination beam into an image light beam. The projection lens is disposed on a transmission path of the image light beam and is configured to project the image light beam out of the projection apparatus. When the first light beam is transmitted to the light-homogenizing element, the first light beam is not incident on the wavelength conversion device.

To sum up, the embodiments of the disclosure have at least one of the following advantages or effects. In the illumination system and the projection apparatus provided by the disclosure, the light source provided by the light source may be transmitted along a plurality of different optical paths through design and arrangement of the light-splitting device and the light-filtering device, such that the wavelength conversion device may include the single wavelength conversion material only. In this way, the volume and the optical path of the light source may be reduced and simplified. In addition, the structure of the wavelength conversion device may be simplified, such that manufacturing costs are lowered, the heat dissipation area and structural strength of the wavelength conversion device are increased, the working hours required for adjusting and calibrating the wavelength conversion device are reduced, and complexity of controlling the wavelength conversion device by the electronic system is decreased.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
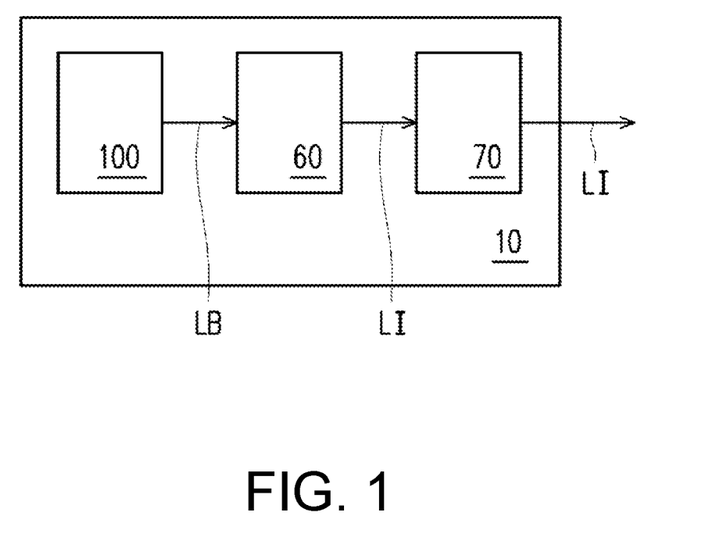
FIG. 1 is a schematic view of a projection apparatus according to an embodiment of the disclosure.

FIG. 1 is a schematic view of a projection apparatus according to an embodiment of the disclosure. With reference to FIG. 1, the embodiment provides a projection apparatus 10 including an illumination system 100, at least one light valve 60, and a projection lens 70. Herein, the illumination system 100 is configured to provide an illumination light beam LB. The light valve 60 is disposed on a transmission path of the illumination light beam LB and is configured to convert the illumination light beam LB into an image light beam LI. The projection lens 70 is disposed on a transmission path of the image light beam LI and is configured to project the image light beam LI out of the projection apparatus 10 to a projection target (not shown) such as a screen or a wall.

The light valve 60 is, for example, a reflective light modulator such as a liquid crystal on silicon panel (LCoS panel) and a digital micro-mirror device (DMD). In some embodiments, the light valve 60 may also be, for example, a transmissive light modulator such as a transparent liquid crystal panel, an electro-optical modulator, a magneto-optic modulator, and an acousto-optic modulator (AOM). A form and a type of the light valve 60 is not particularly limited in the disclosure. Detailed steps and implementation of a method for converting the illumination light beam L1 into the image light beam LI by the light valve 60 may be obtained through sufficient teachings, suggestions, and other details in the art, and that repeated description is not provided herein. In this embodiment, a number of the light valve 60 is one, and the projection apparatus 10 is, for example, a projection apparatus using a single digital micro-mirror device. Nevertheless, in other embodiments, the number of the light valve may be plural, which should however not be construed as limitations to the disclosure.

The projection lens 70 includes, for example, one or a plurality of optical lens combinations with refracting powers including various non-planar lens combinations of a biconcave lens, a biconvex lens, a concave-convex lens, a convex-concave lens, a plane-convex lens, and a plane-concave lens, for example. In an embodiment, the projection lens 70 may further include a planar optical lens, so as to project the image light beam LI from the light valve 60 to the projection target through reflection. A form and a type of the projection lens 70 is not particularly limited in the disclosure.

Figure 2A:
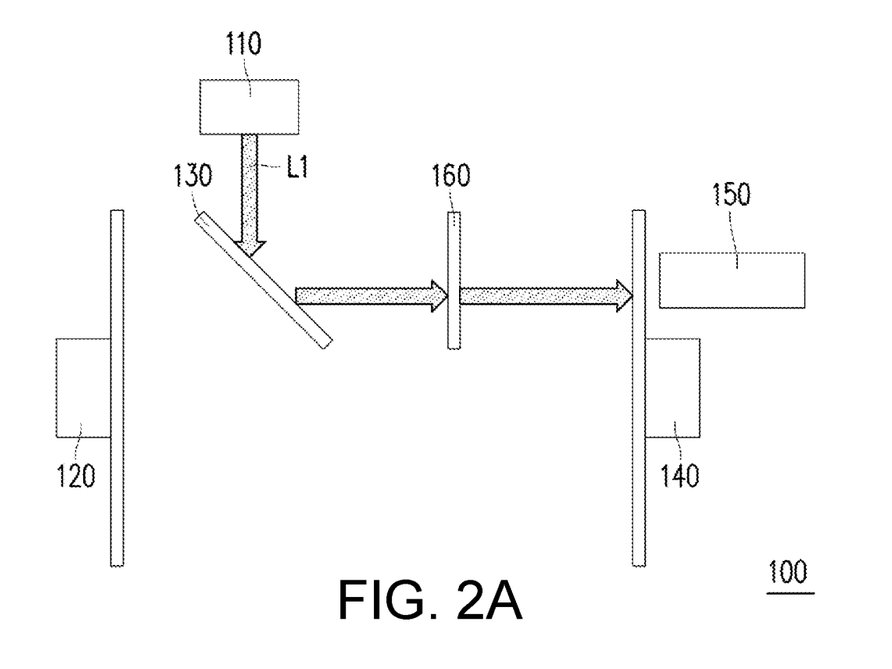
FIG. 2A and FIG. 2B are schematic views of an illumination system under different time series according to an embodiment of the disclosure.
Figure 2B:
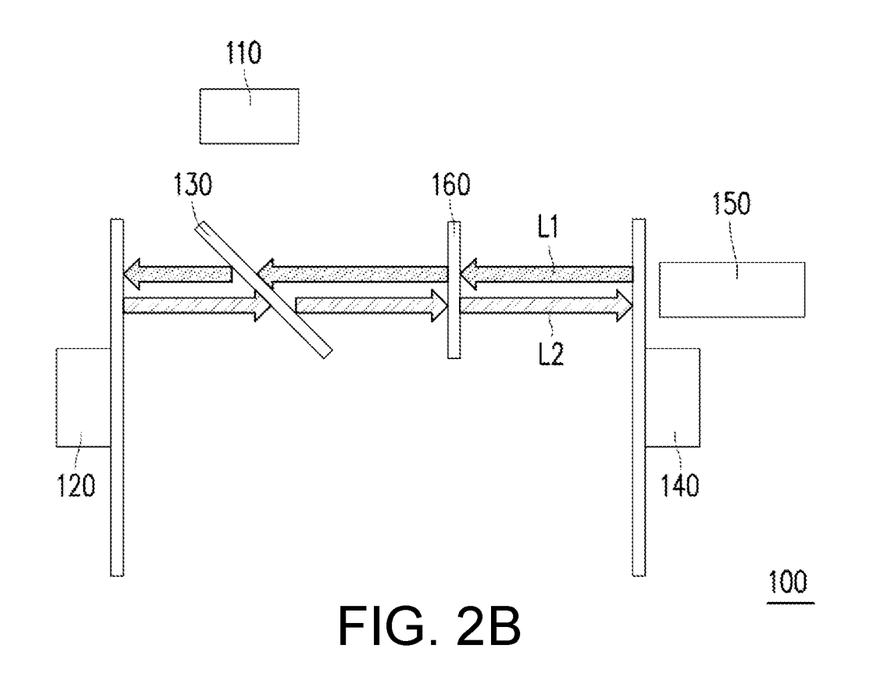

FIG. 2A and FIG. 2B are schematic views of an illumination system under different time series according to an embodiment of the disclosure. The illumination system 100 shown in FIG. 2A may at least be applied to the projection apparatus 10 shown in FIG. 1. In this embodiment, the illumination system 100 includes a first light source 110, a wavelength conversion device 120, a first light-splitting element 130, a light-filtering device 140, and a light-homogenizing element 150. To be specific, the illumination system 100 provided in this embodiment further includes a polarization-converting element 160. In this embodiment, a light beam emitted by the first light source 110 is transmitted to the light-filtering device 140 through the first light-splitting element 130, and the light beam is transmitted to the wavelength conversion device 120 through reflection performed by the light-filtering device 140 or is transmitted to the light-homogenizing element 150 through the light-filtering device 140 at different timing. Herein, the first light source 110 is configured to provide a first light beam L1. In this embodiment, the first light source 110 is a blue laser diode, so that the first light beam L1 is a blue light beam.

Figure 3:
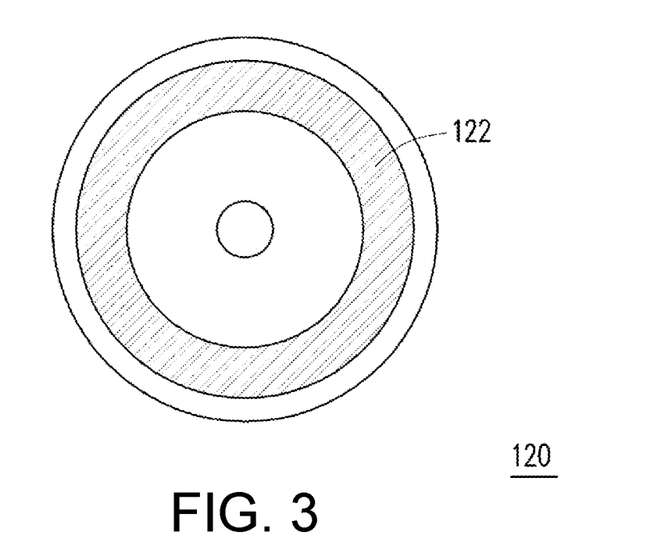
FIG. 3 is a schematic view of a wavelength conversion device of the illumination system in FIG. 2A.

FIG. 3 is a schematic view of a wavelength conversion device of the illumination system in FIG. 2A. With reference to FIG. 2B and FIG. 3, the wavelength conversion device 120 is disposed on a transmission path of the first light beam L1. The wavelength conversion device 120 is, for example, a wavelength conversion wheel (a phosphor wheel), includes a single wavelength conversion material 122, and is configured to convert the first light beam L1 into a conversion light beam L2. For instance, the wavelength conversion material 122 is, for example, a yellow phosphor, so that the conversion light beam L2 is a yellow light beam. In other words, the so-called single wavelength conversion material 122 means that the wavelength conversion device 120 includes no other wavelength conversion materials except for the wavelength conversion material 122. Further, the wavelength conversion material 122 only converts a beam of a single wavelength range. In this embodiment, a region where the single wavelength conversion material 122 distributed in the wavelength conversion device 120 is a closed ring shape (O-ring type) as shown in FIG. 3. In this way, a process of manufacturing the wavelength conversion device 120 may be simplified, and working hours required for coating the wavelength conversion material 122 may be saved.

The first light-splitting element 130 is disposed on transmission paths of the first light beam L1 and the conversion light beam L2. In this embodiment, the first light-splitting element 130 is configured to reflect the first light beam L1 having a first polarization state and allow the first light beam L1 having a second polarization state to pass through. For instance, the first light-splitting element 130 is, for example, a blue polarizing beam splitter (BPBS) and is configured to reflect a blue light beam of s polarization and allow a blue light beam of p polarization to pass through. In this embodiment, the first light-splitting element 130 has an anti-reflection coated film. In this way, light beams of other wave bands are allowed to pass through.

Figure 4:
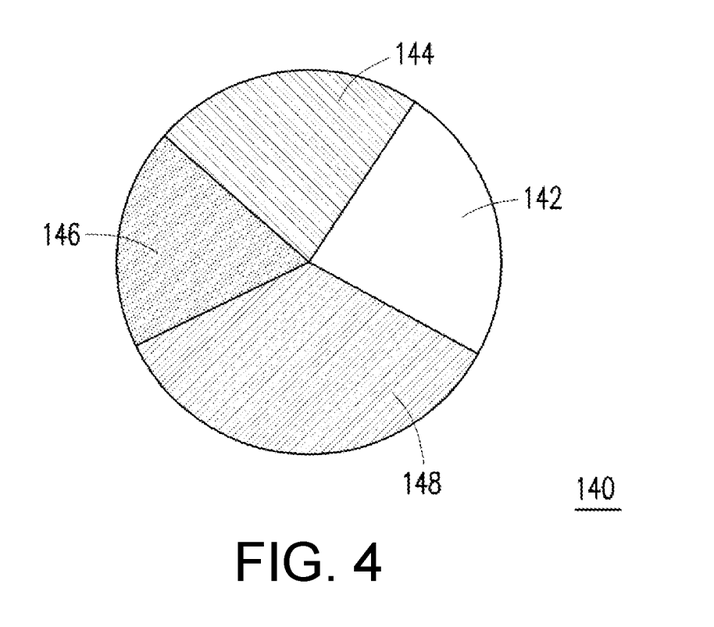
FIG. 4 is a schematic view of a light-filtering device of the illumination system in FIG. 2A.

FIG. 4 is a schematic view of a light-filtering device of the illumination system in FIG. 2A. With reference to FIG. 2A to FIG. 4, the light-filtering device 140 is disposed on the transmission paths of the first light beam L1 and the conversion light beam L2. The light-filtering device 140 has at least three regions. At least one among the at least three regions is configured to diffuse the first light beam L1, and at least another one among the at least three regions is configured to reflect the first light beam L1. To be specific, in this embodiment, the light-filtering device 140 includes a first region 142, a second region 144, a third region 146, and a fourth region 148. The first region 142 is, for example, a dichroic mirror with blue reflect (DMB) configured to reflect the first light beam L1 and allow at least a part of the conversion light beam L2 to transmit and pass through to form yellow light. The second region 144 is, for example, a dichroic mirror with cyan reflect (DMC) configured to reflect green and blue light wave bands of the first light beam L1 and the conversion light beam L2 to form red light. The third region 146 is, for example, a diffuser configured to diffuse the passing first light beam L1. The fourth region 148 is, for example, a dichroic mirror with blue and red reflect (DMBR) configured to reflect red and blue wave bands of the first light beam L1 and the conversion light beam L2 to form green light.

The light-homogenizing element 150 is disposed on the transmission paths of the first light beam L1 and the conversion light beam L2. The light-homogenizing element 150 is configured to adjust a shape of a speckle of a light beam. In this way, the shape of the speckle of the light beam may match a shape (e.g., rectangle) of a working region of a light valve, and portions of the speckle exhibit identical or similar light intensity, so that light intensity of the light beam is homogenized. In the embodiment, the light-homogenizing element 150 is, for example, an integration rod. Nevertheless, in other embodiments, the light-homogenizing element 150 may also be an optical element of another suitable form such as a lens array (fly eye lens array), which should however not be construed as limitations to the disclosure.

The polarization-converting element 160 is disposed on the transmission path of the first light beam L1 and is configured to convert a polarization state of the first light beam L1 when the first light beam L1 passes through. The polarization-converting element 160 is, for example, a quarter-wave plate configured to convert a linearly-polarized light beam into a circularly-polarized light beam. To be specific, in this embodiment, the first light beam L1 having the first polarization state (e.g., s polarization) is transmitted from the first light source 110 to the first light-splitting element 130, and the first light beam L1 is reflected to the polarization-converting element 160 through the first light-splitting element 130. After being transmitted and passing through the polarization-converting element 160, the first light beam L1 is converted from the first polarization state to a circular polarization state (e.g., left circular polarization). The first light beam L1 having the circular polarization state is transmitted to the first region 142, the second region 144, the third region 146, and the fourth region 148 of the light-filtering device 140 according to a time series. When the first light beam L1 is transmitted to the first region 142, the second region 144, and the fourth region 148, the first light beam L1 is reflected by the first region 142, the second region 144, and the fourth region 148 to be transmitted to and passes through the polarization-converting element 160 to be converted to the second polarization state (e.g., p polarization), so as to be further transmitted to the wavelength conversion device 120 to be converted to the conversion light beam L2. The conversion light beam L2 having no polarization state is transmitted to and passes through the first light-splitting element 130 and the polarization-converting element 160, is respectively transmitted to and passes through the first region 142, the second region 144, and the fourth region 148 according to the time series to form yellow light, red light, and green light, is finally transmitted to the light-homogenizing element 150.

If the first light beam L1 is transmitted to the third region 146, generally no reflection occurs, and the first light beam L1 is transmitted into the light-homogenizing element 150 after being diffused through the third region 146. In other words, when the first light beam L1 is transmitted to the light-homogenizing element 150, the first light beam L1 is not incident on (transmitted to) the wavelength conversion device 120. Therefore, in some embodiments, the region where the single wavelength conversion material 122 is distributed in the wavelength conversion device 120 may also be a C-shaped region, and through further design, a region where the wavelength conversion material 122 not distributed may correspond to the third region 146 of the light-filtering device 140. In addition, in the region where the wavelength conversion material 122 is not distributed, a substrate material may be maintained to be used, and transparent glass or a reflective material is not required to be arranged. As such, the wavelength conversion material 122 is saved. In this way, a volume of the first light source 110 may be reduced, and an optical path of the first light source 110 may be simplified. In addition, a structure of the wavelength conversion device 120 may be simplified, such that manufacturing costs are lowered, a heat dissipation area and structural strength of the wavelength conversion device 120 are increased, working hours required for adjusting and calibrating the wavelength conversion device 120 are reduced, and complexity of controlling the wavelength conversion device 120 by an electronic system is decreased.

Figure 5A:
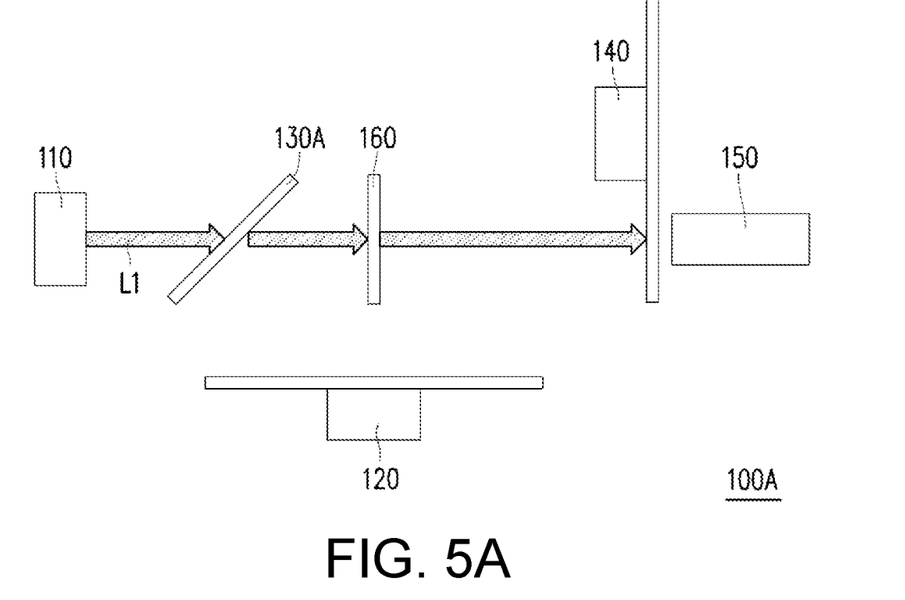
FIG. 5A and FIG. 5B are schematic views of an illumination system under different time series according to another embodiment of the disclosure.
Figure 5B:
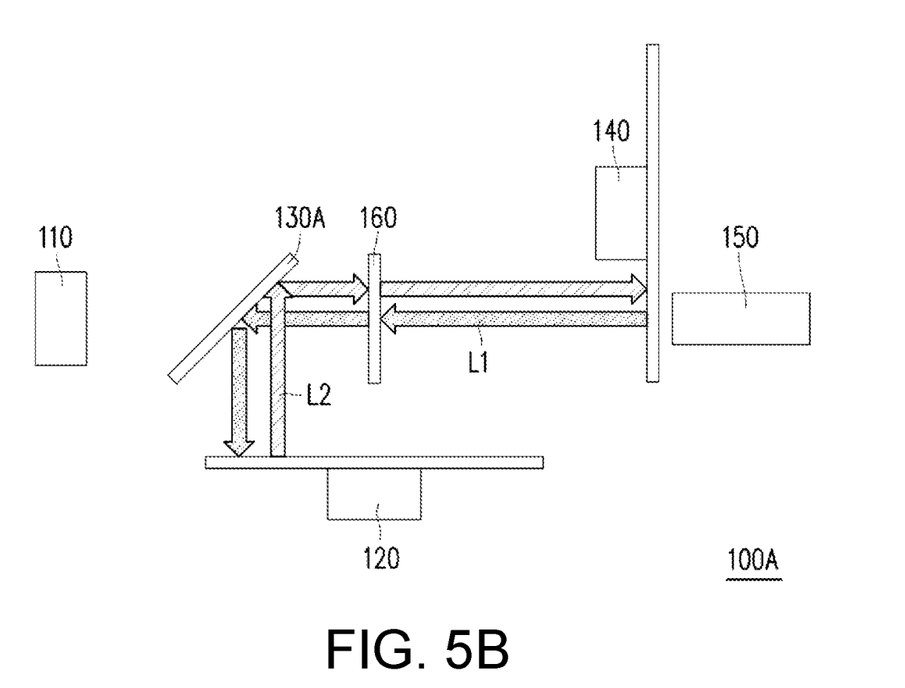

FIG. 5A and FIG. 5B are schematic views of an illumination system under different time series according to another embodiment of the disclosure. With reference to FIG. 5A and FIG. 5B, an illumination system 100A provided by this embodiment is similar to the illumination system 100 shown in FIG. 2A and FIG. 2B. A difference therebetween is that in this embodiment, a first light-splitting element 130A of the illumination system 100A is, for example, a BPBS with a coated film for reflecting a wave band of the conversion light beam L2. To be specific, the first light-splitting element 130A is coated with a reflective yellow light coated film to act as a dichroic mirror with yellow reflect (DMY). Therefore, the first light-splitting element 130A provided by this embodiment may further reflect the conversion light beam L2, such that arrangement of the first light-splitting element 130A and arrangement positions of the first light source 110 and the wavelength conversion device 120 may be adjusted. To be specific, in the embodiment of FIG. 5A and FIG. 5B, the first light-splitting element 130A is configured to reflect the first light beam L1 having the first polarization state and allow the first light beam L1 having the second polarization state to pass through. The first light beam L1 having the second polarization state (e.g., p polarization in this embodiment) passes through the first light-splitting element 130A and the polarization-converting element 160, and the first light beam L1 having the second polarization state is transmitted to the first region 142, the second region 144, the third region 146, and the fourth region 148 of the light-filtering device 140 according to the time series. When the first light beam L1 is transmitted to the third region 146, generally no reflection occurs, and the first light beam L1 is transmitted into the light-homogenizing element 150 after being diffused through the third region 146. When the first light beam L1 is transmitted to the first region 142, the second region 144, and the fourth region 148 according to the time series, the first light beam L1 is reflected by the first region 142, the second region 144, and the fourth region 148, and the first light beam L1 is transmitted to and passes through the polarization-converting element 160 to be converted to the first polarization state (e.g., s polarization), and is then transmitted to the first light-splitting element 130A. The circular polarization state conversion of the first light beam L1 when passing through the polarization-converting element 160, the first region 142, the second region 144, and the fourth region 148 is similar to that provided in the embodiment of FIG. 2A and FIG. 2B, and description thereof is not repeated herein. The first light-splitting element 130A reflects the first light beam L1 having the first polarization state to the wavelength conversion device 120 to be converted to the conversion light beam L2. The conversion light beam L2 may be reflected by the first light-splitting element 130A coated with the coated film for reflecting the wave band of the conversion light beam L2, and the conversion light beam L2 is then transmitted to and passes through the polarization-converting element 160, the conversion light beam L2 is respectively transmitted to and passes through the first region 142, the second region 144, and the fourth region 148 according to the time series to form yellow light, red light, and green light, and is finally transmitted to the light-homogenizing element 150.

Figure 6:
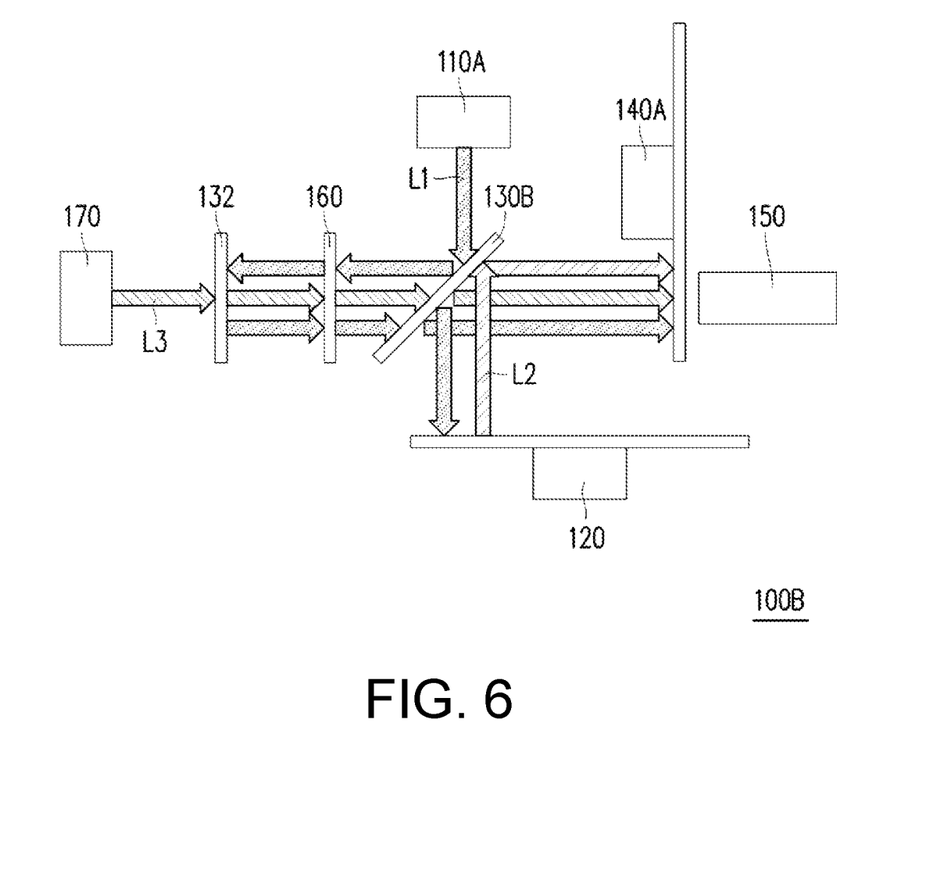
FIG. 6 is a schematic view of an illumination system according to another embodiment of the disclosure.
Figure 7:
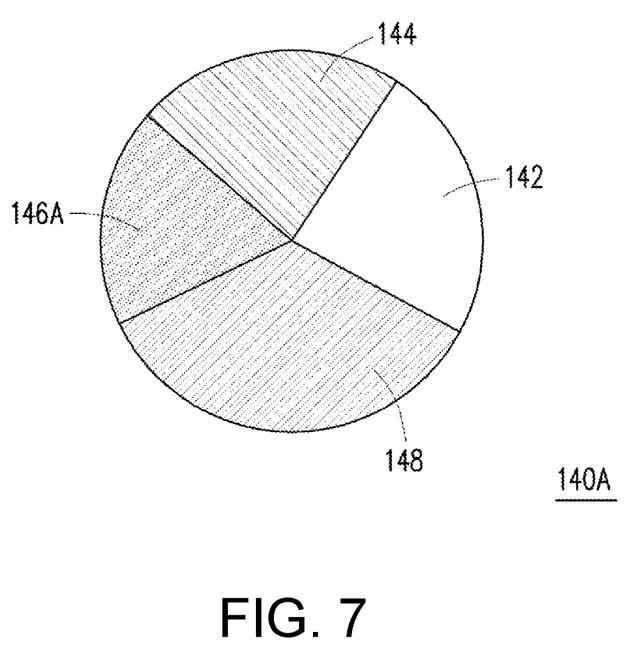
FIG. 7 is a schematic view of a light-filtering device of the illumination system in FIG. 6.

FIG. 6 is a schematic view of an illumination system according to another embodiment of the disclosure. FIG. 7 is a schematic view of a light-filtering device of the illumination system in FIG. 6. With reference to FIG. 6 and FIG. 7, an illumination system 100B provided by this embodiment is similar to the illumination system 100 shown in FIG. 2A and FIG. 2B. A difference therebetween is that in this embodiment, a first light source 110A of an illumination system 100B is configured to provide a blue light beam having the first polarization state and the blue light beam having the second polarization state at the same time, and intensity of energy of one (one of the blue light beam having the first polarization state and the blue light beam having the second polarization state) transmitted to the wavelength conversion device 120 is greater than intensity of energy of the other one not transmitted to the wavelength conversion device 120. For instance, in this embodiment, a light beam provided by the first light source 110A has 15% of a blue light beam having s polarization and 85% of a blue light beam having p polarization, and the 85% of the blue light beam having p polarization is configured to be transmitted to the wavelength conversion device 120. Nevertheless, a ratio of the blue light beams having different polarization states is not particularly limited by the disclosure. To be specific, in this embodiment, a first light-splitting element 130B is, for example, a BPBS coated with a coated film for reflecting a wave band of the conversion light beam L2. To be specific, the first light-splitting element 130B is coated with a reflective green and orange light coated film to act as a dichroic mirror with green and orange reflect (DMGO). Hence, when the 85% of the blue light beam having p polarization is transmitted to and passes through the first light-splitting element 130B and is transmitted to the wavelength conversion device 120, the 85% of the blue light beam of p polarization is converted to the conversion light beam L2. In addition, in this embodiment, a third region 146A of a light-filtering device 140A is coated with a reflective yellow light coated film to act as a DMY. Therefore, the conversion light beam L2 may be reflected in the time series when the blue light beam is provided to the light-homogenizing element 150.

Further, the illumination system 100B provided by this embodiment further includes a third light source 170 and a second light-splitting element 132. The third light source 170 is configured to provide a third light beam L3, and the first light-splitting element 130B is configured to allow the third light beam L3 to pass through. The second light-splitting element 132 is disposed on a transmission path of the 15% of the blue light beam having s polarization and is configured to reflect the first light beam L1 and allow the third light beam L3 to pass through. In this embodiment, the third light source 170 is a red laser diode, so that the third beam L3 is a red light beam. The second light-splitting element 132 may be designed to be similar to a DMB. Therefore, the illumination system 100B in which red, green, blue, and yellow are transmitted to the light-homogenizing element 150 according to the time series may be built through arrangement of the light-filtering device 140A. Alternatively, in another embodiment, the third light source 170 may be omitted, the first light-splitting element 130B may be further designed to be similar to the DMY having a reflective yellow light coated film provided in the embodiment of FIG. 5A and FIG. 5B, and the second light-splitting element 132 may be changed and designed to be a reflective mirror.

Figure 8:
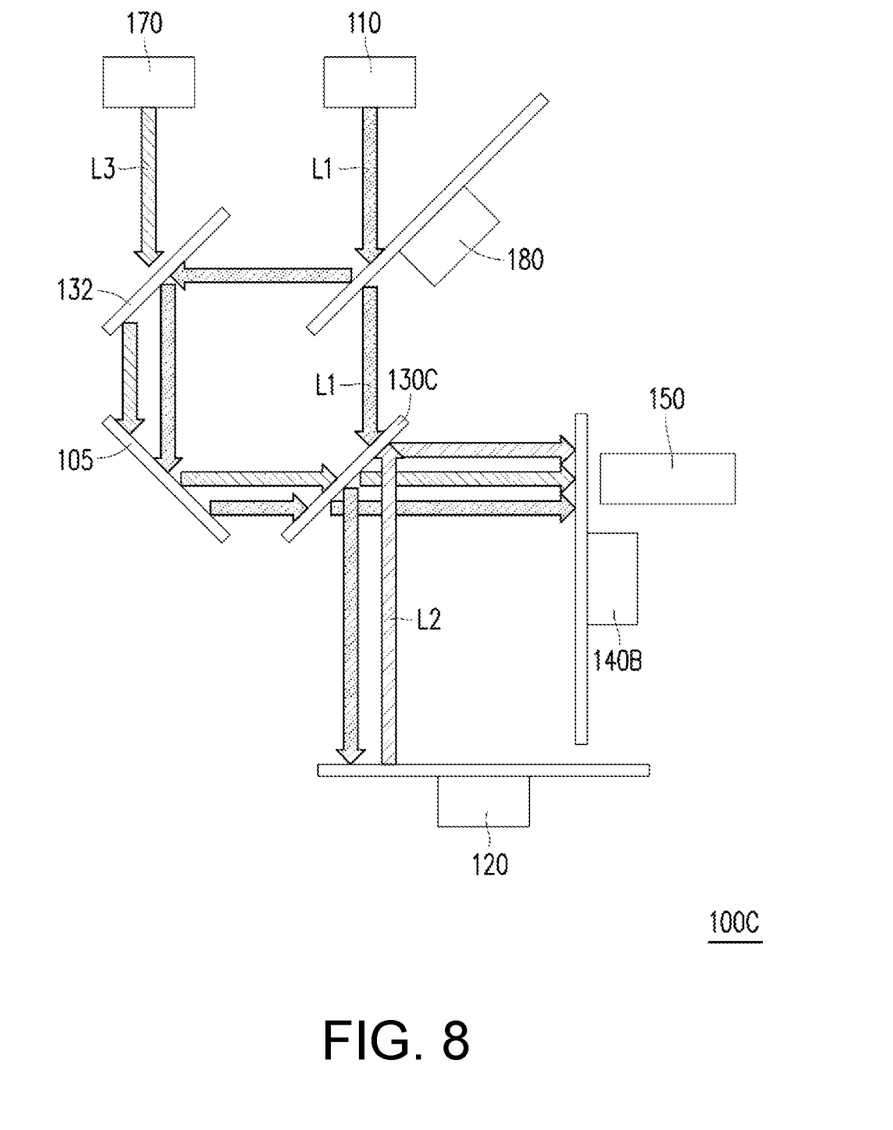
FIG. 8 is a schematic view of an illumination system according to another embodiment of the disclosure.
Figure 9:
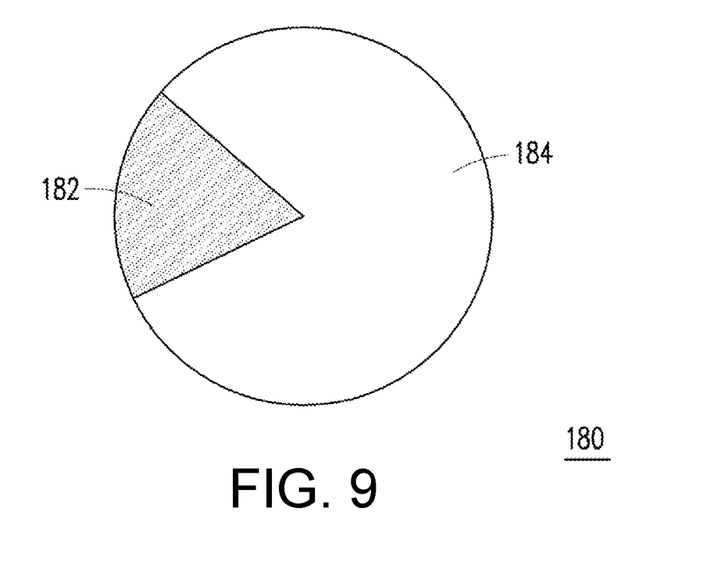
FIG. 9 is a schematic view of an optical device of the illumination system in FIG. 8.
Figure 10:
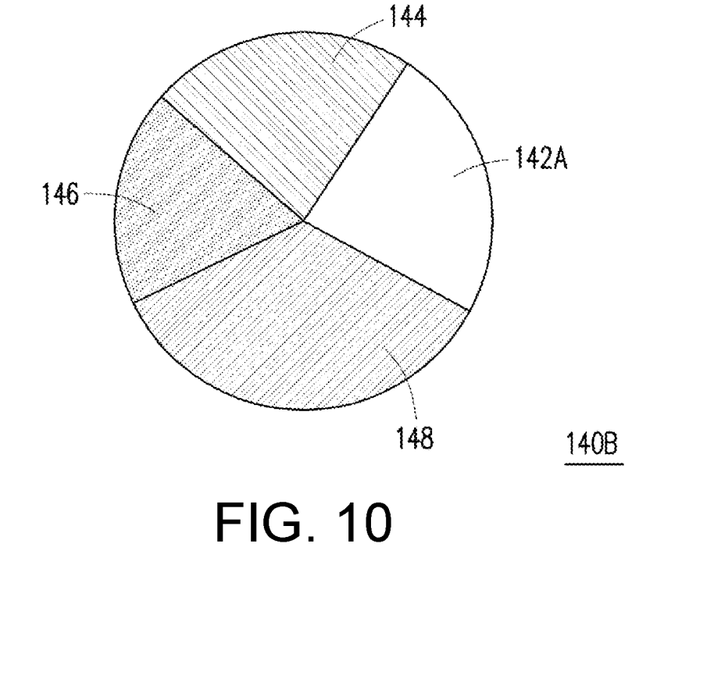
FIG. 10 is a schematic view of a light-filtering device of the illumination system in FIG. 8.

FIG. 8 is a schematic view of an illumination system according to another embodiment of the disclosure. FIG. 9 is a schematic view of an optical device of the illumination system in FIG. 8. FIG. 10 is a schematic view of a light-filtering device of the illumination system in FIG. 8. With reference to FIG. 8 to FIG. 10, an illumination system 100C provided by this embodiment is similar to the illumination system 100B shown in FIG. 6. The illumination system 100C includes the third light source 170 and the second light-splitting element 132 as well, and identical elements are labeled with the same reference numbers. A difference therebetween is that in this embodiment, a first region 142A of a light-filtering device 140B of the illumination system 100C does not include a light-splitting coated film for reflecting blue light. The first region 142 in this embodiment is a transparent element such as pure transparent glass. The illumination system 100C does not have a polarization-converting element. A first light-splitting element 130C of the illumination system 100C is not required to include a BPBS, and the first light-splitting element 130C is only required to exhibit a function of reflecting the conversion light beam L2. In this embodiment, the first light-splitting element 130C is, for example, a DMGO. Besides, the illumination system 100C further includes an optical device 180 disposed on the transmission path of the first light beam L1 and is configured to sequentially reflect the first light beam L1 and allow the first light beam L1 to pass through. The optical device 180 includes a reflective region 182 and a transparent region 184. An area of the reflective region 182 is less than an area of the transparent region 184. A position of the reflective region 182 of the optical device 180 corresponds to a position of the third region 146 of the light-filtering device 140B. A position of the transparent region 184 of the optical device 180 corresponds to positions of the first region 142A, the second region 144, and the fourth region 148 of the light-filtering device 140B, as shown in FIG. 9 and FIG. 10.

To be specific, in this embodiment, the first light beam L1 is transmitted from the first light source 110 to the reflective region 182 and the transparent region 184 of the optical device 180 based on the time series. When the first light beam L1 is transmitted to the reflective region 182, the first light beam L1 is reflected by the reflective region 182 and is transmitted to the second light-splitting element 132 acting as a DMB, a reflective element 105, and the first light-splitting element 130C acting as a DMGO in sequence to be transmitted into the third region 146 of the light-filtering device 140B and to be further transmitted into the light-homogenizing element 150. When the first light beam L1 is transmitted to the transparent region 184, the first light beam L1 is allowed to pass through the transparent region 184 and is transmitted to the first light-splitting element 130C acting as a DMGO and is further transmitted to the wavelength conversion device 120 to be converted to the conversion light beam L2. The conversion light beam L2 is then reflected through the first light-splitting element 130C, and then the conversion light beam L2 is transmitted to and enters the light-homogenizing element 150. In this way, design of the polarization state of the light beam may be omitted. In addition, in another embodiment, the third light source 170 may be omitted, the first light-splitting element 130C may be designed to be a DMY, and the second light-splitting element 132 may be changed and designed to be a reflective mirror.

Figure 11:
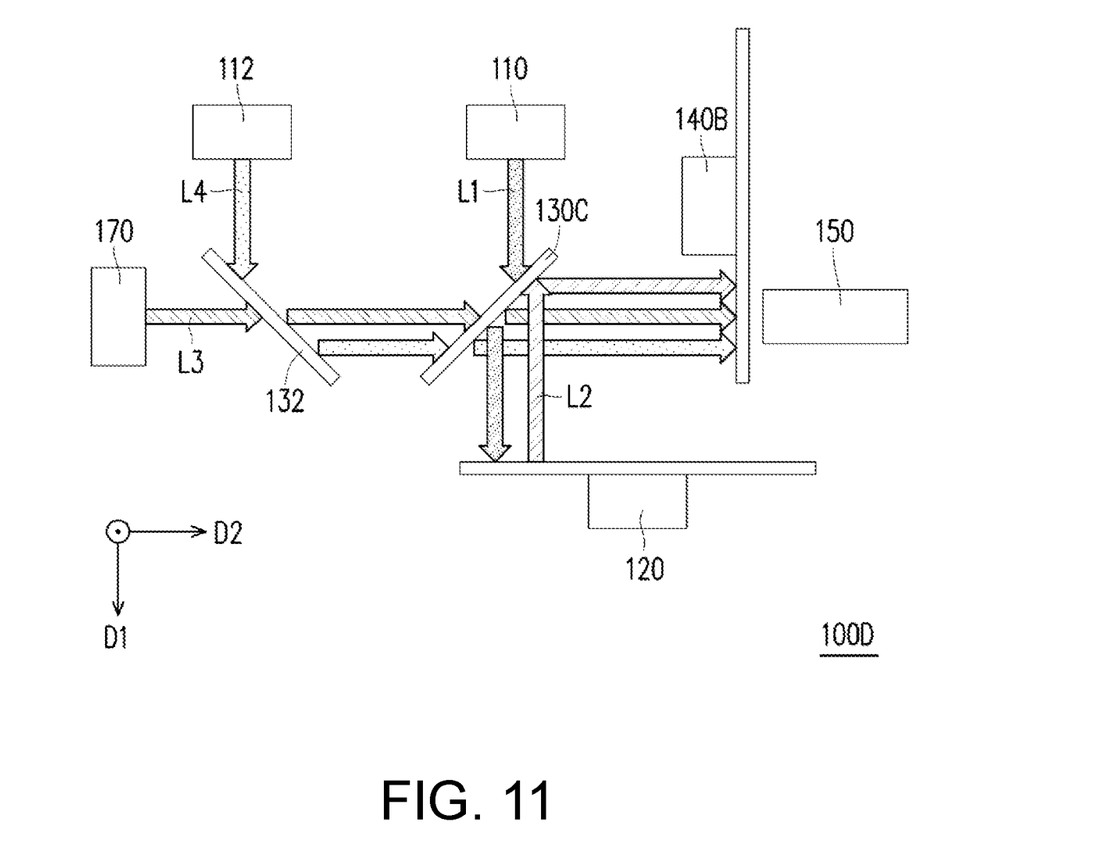
FIG. 11 is a schematic view of an illumination system according to another embodiment of the disclosure.

FIG. 11 is a schematic view of an illumination system according to another embodiment of the disclosure. With reference to FIG. 11, an illumination system 100D provided by this embodiment is similar to the illumination system 100B shown in FIG. 6. The illumination system 100D includes the third light source 170 and the second light-splitting element 132 as well, and identical elements are labeled with the same reference numbers. A difference therebetween is that in this embodiment, the illumination system 100D does not include a polarization-converting element. A first light-splitting element 130C of the illumination system 100D is not required to include a BPBS either, and the first light-splitting element 130C is only required to exhibit a function of reflecting the conversion light beam L2. In this embodiment, the first light-splitting element 130C is, for example, a DMGO. Further, the illumination system 100D further includes a second light source 112 configured to provide a second light beam L4, and the first light-splitting element 130C is configured to allow the first light beam L1 and the second light beam L4 to enter and pass through from different directions. The second light source 112 is a blue laser diode, so that the second light beam L4 is a blue light beam. In this embodiment, a wavelength of the first light beam L1 is, for example 445 nm, and a wavelength of the second light beam L4 is, for example, 462 nm. In this way, a color gamut covered by the illumination system 100D may be increased, and an optical effect is improved, which should however not be construed as limitations to the disclosure.

Besides, the second light-splitting element 132 of the illumination system 100D is configured to reflect the second light beam L4. In this embodiment, the second light-splitting element 132 is a DMB. To be specific, the first light beam L1 is transmitted to and passes through the first light-splitting element 130C from the first light source 110 in a first direction D1 and is further transmitted to the wavelength conversion device 120 to be converted to the conversion light beam L2. The conversion light beam L2 is then reflected by the first light-splitting element 130C and is transmitted to and passes through the light-filtering device 140B shown in FIG. 8 and FIG. 10 to enter the light-homogenizing element 150. On the other hand, the second light beam L4 is emitted from the second light source 112 in the first direction D1 and is transmitted to the second light-splitting element 132. The second light beam L4 is reflected by the second light-splitting element 132, is transmitted to and passes through the first light-splitting element 130C in a second direction D2 perpendicular to the first direction D1, and is further transmitted to and passes through the light-filtering device 140B to enter the light-homogenizing element 150. Moreover, the third light beam L3 is transmitted to and passes through the second light-splitting element 132, the first light-splitting element 130C, and the light-filtering device 140B in sequence from the third light source 170 and is further transmitted to and enters the light-homogenizing element 150. In this way, optical design of the illumination system 100D may be simplified. In another embodiment, the second light-splitting element 132 may be designed to be configured to reflect the third light source 170 and allow the second light beam L4 to pass through, such as a dichroic mirror with red reflect (DMR). Therefore, arrangement positions of the wavelength conversion material 122 and the third light source 170 may be adjusted and exchanged. In addition, in another embodiment, the third light source 170 may be omitted, the first light-splitting element 130C may be designed to be a DMY, and the second light-splitting element 132 may be changed and designed to be a reflective mirror.

In view of the foregoing, the embodiments of the disclosure have at least one of the following advantages or effects. In the illumination system and the projection apparatus provided by the disclosure, the light source provided by the light source may be transmitted along a plurality of different optical paths through design and arrangement of the light-splitting device and the light-filtering device, such that the wavelength conversion device may include the single wavelength conversion material only. In this way, the volume and the optical path of the light source may be reduced and simplified. In addition, the structure of the wavelength conversion device may be simplified, such that manufacturing costs are lowered, the heat dissipation area and structural strength of the wavelength conversion device are increased, the working hours required for adjusting and calibrating the wavelength conversion device are reduced, and complexity of controlling the wavelength conversion device by the electronic system is decreased.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc., following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. An illumination system, comprising a first light source, a third light source, a wavelength conversion device, a first light-splitting element, a light-filtering device, and a light-homogenizing element, wherein:
   the first light source provides a first light beam,
   the third light source providing a third light beam, and the third light beam is a red light beam,
   the wavelength conversion device comprises a single wavelength conversion material configured to convert the first light beam into a conversion light beam,
   the first light-splitting element is disposed on transmission paths of the first light beam and the conversion light beam, and the first light-splitting element is configured to allow the third light beam to pass through,
   the light-filtering device is disposed on the transmission paths of the first light beam and the conversion light beam, and
   the light-homogenizing element is disposed on the transmission paths of the first light beam and the conversion light beam, wherein the first light beam is not incident on the wavelength conversion device when the first light beam is transmitted to the light-homogenizing element.

2. The illumination system according to claim 1, wherein the light-filtering device has at least three regions, wherein at least one among the at least three regions is configured to diffuse the first light beam, wherein at least another one among the at least three regions is configured to reflect the first light beam.

3. The illumination system according to claim 1, wherein the first light-splitting element is configured to reflect the first light beam having a first polarization state and allow the first light beam having a second polarization state to pass through.

4. The illumination system according to claim 3, wherein the illumination system further comprises a polarization-converting element disposed on the transmission path of the first light beam and configured to convert a polarization state of the first light beam when the first light beam passes through.

5. The illumination system according to claim 3, wherein the first light-splitting element has an anti-reflection coated film or a coated film which reflects a wave band of the conversion light beam.

6. The illumination system according to claim 1, wherein the illumination system further comprises a second light-splitting element configured to reflect the first light beam and allow the third light beam to pass through.

7. The illumination system according to claim 1, wherein the illumination system further comprises an optical device disposed on the transmission path of the first light beam and configured to sequentially reflect the first light beam and allow the first light beam to pass through.

8. The illumination system according to claim 1, wherein the illumination system further comprises a second light source providing a second light beam, and the first light-splitting element is configured to allow the first light beam and the second light beam to enter and pass through from different directions.

9. The illumination system according to claim 8, wherein the illumination system further comprises a second light-splitting element configured to reflect the second light beam or allow the second light beam to pass through.

10. The illumination system according to claim 1, wherein a region where the single wavelength conversion material is distributed in the wavelength conversion device is a closed ring shape.

11. A projection apparatus, comprising an illumination system, a light valve, and a projection lens, wherein:
   the illumination system is configured to provide an illumination light beam, the illumination system comprises a first light source, a third light source, a wavelength conversion device, a first light-splitting element, a light-filtering device, and a light-homogenizing element, wherein:
the first light source provides a first light beam,
the third light source providing a third light beam, and the third light beam is a red light beam,
the wavelength conversion device comprises a single wavelength conversion material configured to convert the first light beam into a conversion light beam, the illumination light beam comprises the conversion light beam,
the first light-splitting element is disposed on transmission paths of the first light beam and the conversion light beam, and the first light-splitting element is configured to allow the third light beam to pass through,
the light-filtering device is disposed on the transmission paths of the first light beam and the conversion light beam, and
the light-homogenizing element is disposed on the transmission paths of the first light beam and the conversion light beam,
the light valve is disposed on a transmission path of the illumination beam and is configured to convert the illumination beam into an image light beam, and
the projection lens is disposed on a transmission path of the image light beam and is configured to project the image light beam out of the projection apparatus, wherein the first light beam is not incident on the wavelength conversion device when the first light beam is transmitted to the light-homogenizing element.

12. The projection apparatus according to claim 11, wherein the light-filtering device has at least three regions, wherein at least one among the at least three regions is configured to diffuse the first light beam, wherein at least another one among the at least three regions is configured to reflect the first light beam.

13. The projection apparatus according to claim 11, wherein the first light-splitting element is configured to reflect the first light beam having a first polarization state and allow the first light beam having a second polarization state to pass through.

14. The projection apparatus according to claim 13, wherein the illumination system further comprises a polarization-converting element disposed on the transmission path of the first light beam and configured to convert a polarization state of the first light beam when the first light beam passes through.

15. The projection apparatus according to claim 13, wherein the illumination light beam further comprises the first light beam, and the first light-splitting element has an anti-reflection coated film or a coated film reflects a wave band of the conversion light beam.

16. The projection apparatus according to claim 11, wherein the illumination system further comprises a second light-splitting element configured to reflect the first light beam and allow the third light beam to pass through.

17. The projection apparatus according to claim 11, wherein the illumination system further comprises an optical device disposed on the transmission path of the first light beam and configured to sequentially reflect the first light beam and allow the first light beam to pass through.

18. The projection apparatus according to claim 11, wherein the illumination system further comprises a second light source providing a second light beam, the first light-splitting element is configured to allow the first light beam and the second light beam to enter and pass through from different directions, and the illumination light beam further comprises the second light beam.

19. The projection apparatus according to claim 18, wherein the illumination system further comprises a second light-splitting element configured to reflect the second light beam or allow the second light beam to pass through.

20. The projection apparatus according to claim 11, wherein a region where the single wavelength conversion material is distributed in the wavelength conversion device is a closed ring shape.

21. An illumination system, comprising a first light source, a wavelength conversion device, a first light-splitting element, a light-filtering device, and a light-homogenizing element, wherein:
the first light source provides a first light beam,
the wavelength conversion device comprises a single wavelength conversion material configured to convert the first light beam into a conversion light beam,
the first light-splitting element is disposed on transmission paths of the first light beam and the conversion light beam,
the light-filtering device is disposed on the transmission paths of the first light beam and the conversion light beam, and
the light-homogenizing element is disposed on the transmission paths of the first light beam and the conversion light beam,
wherein the first light-splitting element is configured to reflect the first light beam having a first polarization state and allow the first light beam having a second polarization state to pass through, and
wherein the first light source provides the first light beam having the first polarization state and the first light beam having the second polarization state at the same time, and intensity of energy of the first light beam transmitted to the wavelength conversion device is greater than intensity of energy of the first light beam not transmitted to the wavelength conversion device.

22. A projection apparatus, comprising an illumination system, a light valve, and a projection lens, wherein:
the illumination system is configured to provide an illumination light beam, the illumination system comprises a first light source, a wavelength conversion device, a first light-splitting element, a light-filtering device, and a light-homogenizing element, wherein:
the first light source provides a first light beam,
the wavelength conversion device comprises a single wavelength conversion material configured to convert the first light beam into a conversion light beam, the illumination light beam comprises the conversion light beam,
the first light-splitting element is disposed on transmission paths of the first light beam and the conversion light beam,
the light-filtering device is disposed on the transmission paths of the first light beam and the conversion light beam, and
the light-homogenizing element is disposed on the transmission paths of the first light beam and the conversion light beam,
the light valve is disposed on a transmission path of the illumination beam and is configured to convert the illumination beam into an image light beam, and
the projection lens is disposed on a transmission path of the image light beam and is configured to project the image light beam out of the projection apparatus, wherein the first light-splitting element is configured to reflect the first light beam having a first polarization state and allow the first light beam having a second polarization state to pass through, and wherein the first light source provides the first light beam having the first polarization state and the first light beam having the second polarization state at the same time, and intensity of energy of the first light beam transmitted to the wavelength conversion device is greater than intensity of energy of the first light beam not transmitted to the wavelength conversion device.

* * * * *